(12) United States Patent
Nowoisky et al.

(10) Patent No.: US 11,519,820 B2
(45) Date of Patent: Dec. 6, 2022

(54) METHOD AND DEVICE FOR MONITORING A JOURNAL BEARING

(71) Applicants: Rolls-Royce Deutschland Ltd & Co KG, Blankenfelde-Mahlow (DE); Rolls-Royce plc, London (GB)

(72) Inventors: Sebastian Nowoisky, Michendorf (DE); Noushin Mokhtari Molk Abadi, Berlin (DE); Jonathan Pelham, Shortstown (GB)

(73) Assignees: ROLLS-ROYCE DEUTSCHLAND LTD & CO KG, Blankenfel de-Mahlow (DE); ROLLS-ROYCE PLC, London (GB)

(*) Notice: Subject to any disclaimer, the term of this patent is extended or adjusted under 35 U.S.C. 154(b) by 549 days.

(21) Appl. No.: 16/545,782

(22) Filed: Aug. 20, 2019

(65) Prior Publication Data

US 2020/0088605 A1  Mar. 19, 2020

(30) Foreign Application Priority Data

Sep. 19, 2018 (DE) .................. 10 2018 123 025.7

(51) Int. Cl.
*G01M 13/045* (2019.01)
*F02C 7/06* (2006.01)

(52) U.S. Cl.
CPC ............. *G01M 13/045* (2013.01); *F02C 7/06* (2013.01); *F05B 2260/40311* (2013.01); *F05B 2260/80* (2013.01)

(58) Field of Classification Search
None
See application file for complete search history.

(56) References Cited

U.S. PATENT DOCUMENTS

2004/0108967 A1* 6/2004 Fujimura ............ H01Q 1/38
343/702
2007/0118333 A1  5/2007 Miyasaka et al.
(Continued)

FOREIGN PATENT DOCUMENTS

DE   102010034749 A1   2/2012
DE   102017200964 A1   7/2018
(Continued)

OTHER PUBLICATIONS

German Search Report dated Jun. 3, 2019 from counterpart German Patent Application No. DE 10 2018 123 025.7.
(Continued)

*Primary Examiner* — Raul J Rios Russo
*Assistant Examiner* — Carl F. R. Tchatchouang
(74) *Attorney, Agent, or Firm* — Shuttleworth & Ingersoll, PLC; Timothy J. Klima

(57) ABSTRACT

A method for monitoring at least one journal bearing for a shaft in respect to at least one acoustic event is provided. The at least one journal bearing is coupled with a gearbox, wherein
a time dependent solid borne sound signal is detected by at least one solid borne sound signal sensor,
the output signal of the at least one solid borne sound signal sensor is transmitted to a signal pre-processing device,
frequency components of the solid borne sound signal with of more than 250 kHz are amplified in the signal pre-processing device and/or
with a frequency of less than 50 kHz are attenuated in the signal pre-processing device, and
the output signal of the signal pre-processing device is wirelessly transmitted via an antenna device to a signal evaluation device for the detection and/or location of the at least one acoustic event.

12 Claims, 5 Drawing Sheets

(56) References Cited

U.S. PATENT DOCUMENTS

| | | | | |
|---|---|---|---|---|
| 2008/0279686 A1* | 11/2008 | Demtroder | .............. | F03D 17/00 |
| | | | | 475/158 |
| 2013/0305827 A1 | 11/2013 | Kessler et al. | | |
| 2015/0059478 A1* | 3/2015 | Klos | ....................... | F03D 17/00 |
| | | | | 73/602 |
| 2015/0330950 A1* | 11/2015 | Bechhoefer | ............ | G01N 29/46 |
| | | | | 73/587 |
| 2017/0102292 A1* | 4/2017 | Mastro | .................... | F01D 25/18 |
| 2019/0316488 A1* | 10/2019 | Menczykalski | .......... | F01M 1/02 |

FOREIGN PATENT DOCUMENTS

| | | | | |
|---|---|---|---|---|
| EP | 2946721 A1 * | 11/2015 | ........... | A61B 5/0077 |
| JP | H0926414 A | 1/1997 | | |
| WO | WO-2015065873 A2 * | 5/2015 | ............. | F03D 17/00 |

OTHER PUBLICATIONS

Duan et al., "Helicopter Main Gearbox Bearing Defects Identificaiton with Acoustic Emission Techniques", IEEE Conference on Prognostics and Health Management (ICPHM), 2016.
Greaves et al., Final Report EASA_REP_RESEA_2012_6, Research Project: (VHM), Vibration Health or Alternative Monitoring Technologies for Hellicopters, European Aviation Safety Agency.
Wikipedia: "Direct-conversion receiver", Verson Nov. 18, 2017, pp. 1-4.
European Search Report dated Feb. 7, 2020 from counterpart European Patent Application No. 19 19 7907.

* cited by examiner

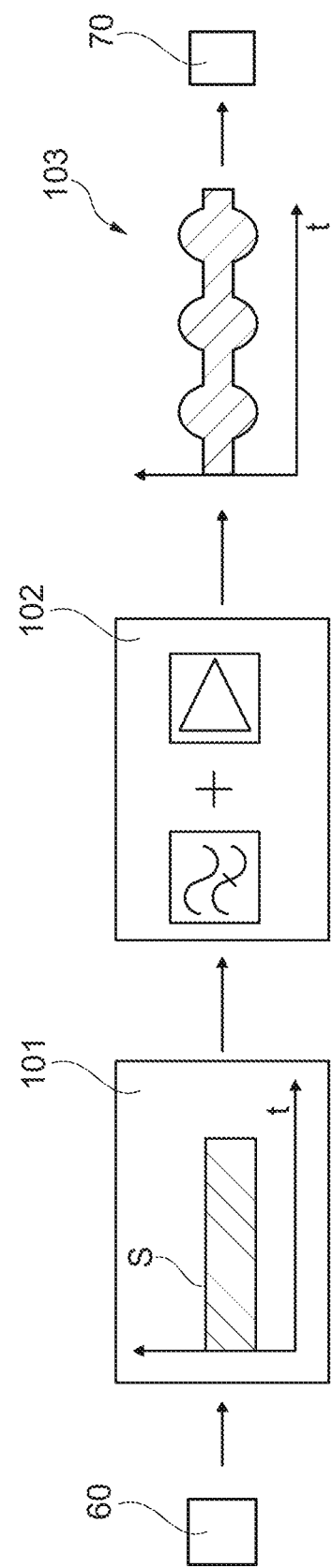

METHOD AND DEVICE FOR MONITORING A JOURNAL BEARING

REFERENCE TO RELATED APPLICATION

This application claims priority to German Patent Application No. 10 2018 123 025.7 filed on Sep. 19, 2018, the entirety of which is incorporated by reference herein.

BACKGROUND

The present disclosure relates to a method for monitoring a journal bearing with features as disclosed herein and a device for monitoring a journal bearing with features as disclosed herein.

Journal bearings (or plain bearings) are a machine element which can be used in many applications, in which the relative movement between a shaft and the bearing shell of the journal bearing or an intermediate medium is a sliding movement.

One application for journal bearings is e.g. the mounting of planetary gears in epicyclic gearboxes (e.g. planetary configuration or star configuration) in turbofan aircraft engines.

As requirements for new engines in terms of fuel consumption, $CO_2$ emissions and acoustic emissions increase, new engine components have to be developed. In some modern turbofan engines the compressor and the turbine are decoupled from the fan by the use of a high-performance epicyclic gearbox. Thereby, these components can be operated at their respective optimal operating points. The possible lower speed of the fan allows an increase in the fan diameter, which leads to a higher bypass mass flow, without producing supersonic flow at the fan tips.

In the high-performance transmissions epicyclic gears are used, with gears, shafts and bearings representing potential wear parts. A failure of these components may have serious effects on the entire aircraft engine. Acoustical events in journal bearings play a major role as they indicate that lubrication has moved away from the desired fluid frictional area.

From Fang Duan et al., "*Helicopter Main Gearbox Bearing Defects Identification with Acoustic Emission Techniques*" IEEE Conference on Prognostics and Health Management (ICPHM), 2016 and the Final Report EASA_REP_RESEA_2012_6, *Vibration Health or Alternative Monitoring Technologies for Helicopters*, wireless transmission of signals associated with monitoring gearboxes is known.

SUMMARY

For this reason, methods and devices are needed to monitor the operation of journal bearings, especially taking into account signals in planetary gear transmissions.

A method for monitoring at least one journal bearing for a shaft is used in respect to at least one acoustic event, in particular a friction or damage related acoustic event, in the journal bearing. It is possible that other events might also cause an acoustic event. The at least one journal bearing is coupled with a gearbox, as it is e.g. used in an aircraft engine.

A time dependent solid borne sound signal (i.e. an acoustic signal in a solid body) is in particular emitted by the journal bearing and detected by at least one solid borne sound signal sensor. Typically, the sensor detects a wide range of frequency components coming from the journal bearing and/or the gearbox, such as the acoustic signals generated by the teeth of the gearbox.

The output of the at least one solid borne sound signal sensor is transmitted to a signal pre-processing device, which processes the received data in the following way(s):

Frequency components of the solid borne sound signal with more than 250 kHz, in particular between 200 kHz and 1 MHz, are amplified in the signal pre-processing device. Alternatively or in addition, frequency components of the solid borne sound signal with a frequency of less than 50 kHz, in particular between 5 Hz and 50 kHz, more in particular between 5 Hz and 30 kHz, are attenuated in the signal pre-processing device.

The processing of the frequency components in the specified frequency ranges is e.g. beneficial when signals need to be transmitted wirelessly.

The output signal of the signal pre-processing device is wirelessly transmitted via an antenna device to a signal evaluation device for the detection and/or location of the at least one acoustic event.

The signal evaluation device demodulates the output signal of the signal pre-processing device for the detection of the at least one acoustic event, the localization of the at least one acoustic event and/or the detection of the wearing status of the journal bearing. It is e.g. possible to detect e.g. a friction related event such as the change from static friction to kinetic friction or vice versa. This kind of event depends on the tribology situation in the bearing. A damage related event depends e.g. on a mechanical damage to the surface of the bearing and/or the shaft in the bearing. The wearing status can be determined by the deterioration of certain measurements over time.

In one embodiment, the output of the at least one solid borne sound signal sensor is transmitted over a wire and/or wirelessly to the signal pre-processing device.

In a further embodiment, the output signal of the signal pre-processing device is encoded as a homodyne signal. This makes the signal more robust for the wireless transmission.

It is also possible, that the at least one journal bearing is part of an epicyclic gearbox, in particular in a wind power generator, a vehicle or an aircraft engine, in particular a geared turbofan engine. Epicyclic gearboxes comprise a plurality of planet gears which are typically rotating around shafts in journal bearings. In particular, all planet gears of the epicyclic gearbox are monitored in respect to the at least one acoustic event.

In another embodiment, the output signal of the signal pre-processing device is transmitted via an antenna device being at least in part coupled to a rotating part connected to the gearbox. The transmission can be e.g. effected from a rotating antenna element, in particular connected to a rotating part of the gearbox to a static antenna element connected to a static part, in particular a static part of the geared turbofan engine. The static antenna element can e.g. be located outside the casing of the gearbox.

The issues are also addressed by device with features as disclosed herein.

The device for monitoring at least one journal bearing in respect to at least one acoustic event comprises at least one solid borne sound signal sensor for detecting a time dependent solid borne sound signal emitted in particular by the journal bearing. It also comprises a signal pre-processing device for pre-processing the received at least one solid borne sound signal, with an amplifier device for frequency components of the solid borne sound signal with a frequency of more than 200 kHz, in particular in the range between 200 kHz and 1 MHz and/or a filter device for frequency components of the solid borne sound signal of less than 50 kHz, in particular with a frequency between 5 Hz and 50 kHz, more in particular between 5 Hz and 30 kHz.

A wireless transmitter comprises an antenna device for the output signal of the pre-processing device, and a signal evaluation device for wirelessly receiving the output signal of the signal pre-processing device, the signal evaluation device comprising a detection and/or location device for the at least one acoustic event.

In one embodiment of the device at least one solid borne sound signal sensor, in particular a piezoelectric element, is coupled to the at least one journal bearing with a glue connection, in particular an epoxy resin connection. Acoustic signals can be efficiently transmitted through the glue transmission.

In a further embodiment, a rotating antenna element, in particular being connected to a rotating part of the gearbox, is the sender in the wireless transmission and a static antenna element connected to a static part, in particular a static part of the geared turbofan engine is the receiver.

One embodiment of the device also comprises a signal evaluation device with a means for detecting the at least one acoustic event and/or a means for the location of the at least one acoustic event.

A gas turbine engine of an aircraft can comprise a device for monitoring at least one journal bearing for a shaft in respect to at least one acoustic event.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm (around 102 inches), 270 cm (around 105 inches), 280 cm (around 110 inches), 290 cm (around 115 inches), 300 cm (around 120 inches), 310 cm (around 122 inches), 320 cm (around 125 inches), 330 cm (around 130 inches), 340 cm (around 135 inches), 350 cm (around 138 inches), 360 cm (around 140 inches), 370 cm (around 145 inches), 380 cm (around 150 inches) or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being Jkg-1K-1/(ms-1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 N kg-1 s, 105 N kg-1 s, 100 N kg-1 s, 95 N kg-1 s, 90 N kg-1 s, 85 Nkg-1 s or 80 N kg-1 s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures.

FIG. 6 shows schematically the filtering and the amplification of the sensor output.

DETAILED DESCRIPTION

Figure 1:
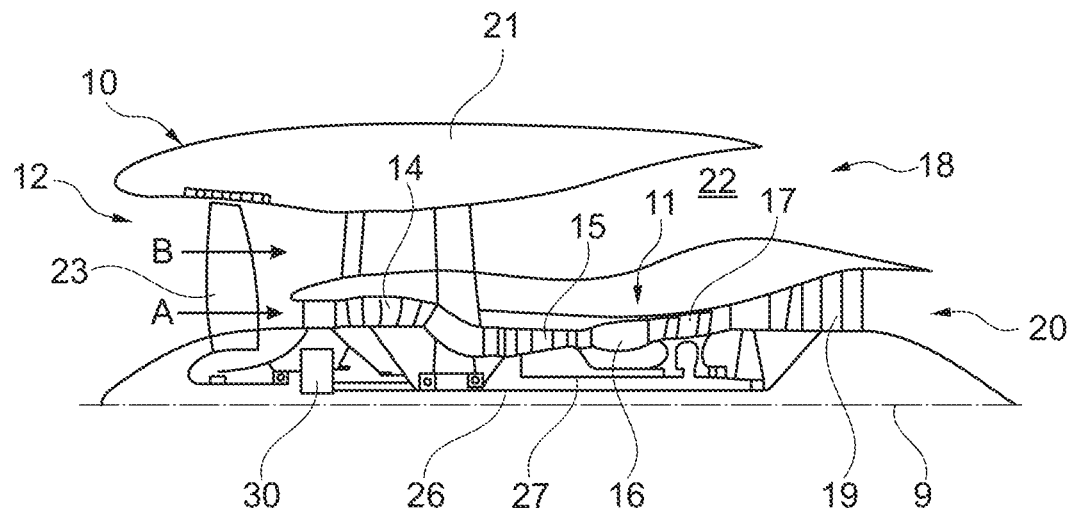
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
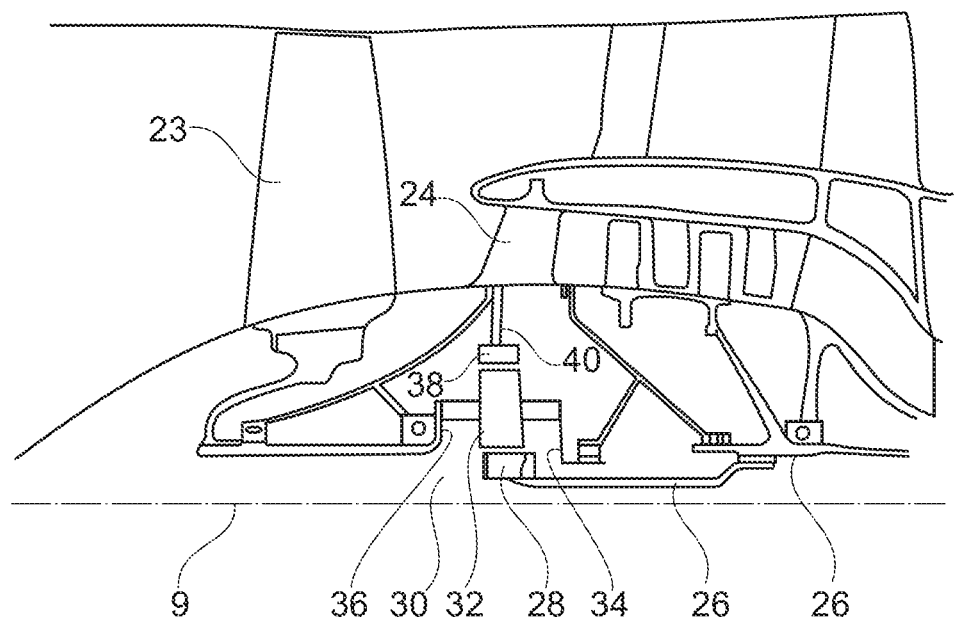
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
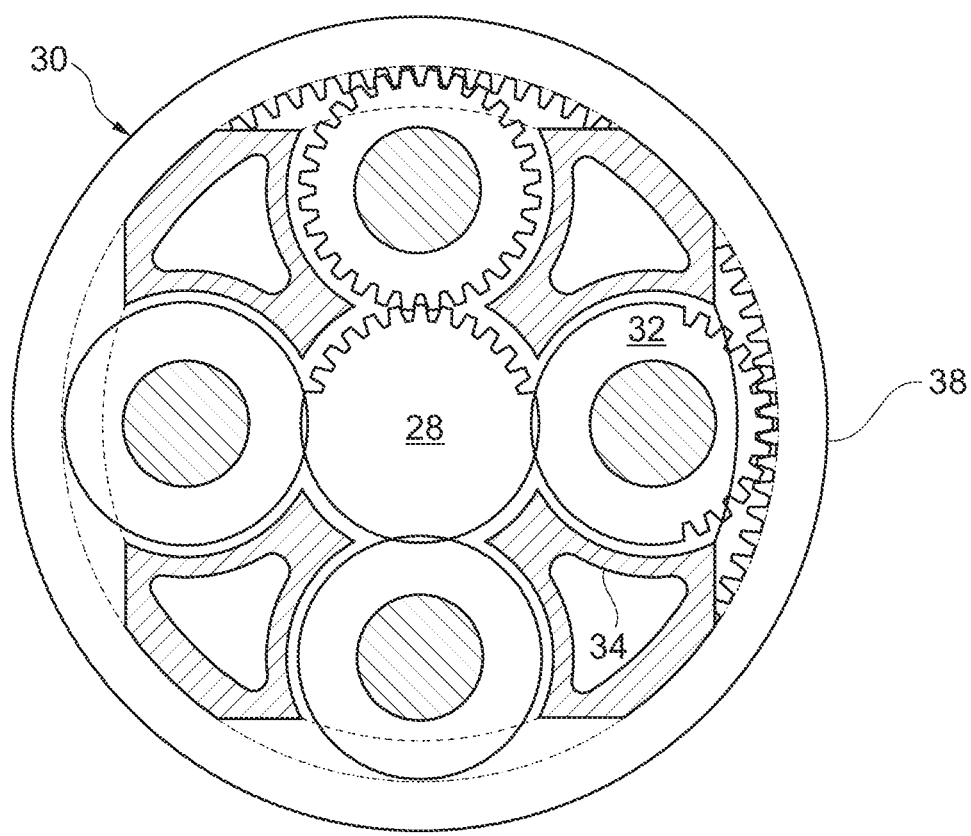
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the proposed solution. Practical applications of a planetary epicyclic gearbox 30 generally comprise at least three planet gears 32.

The epicyclic gearbox 30 illustrated by way of example inFIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In connection with a gearbox 30—such as shown in FIGS. 1 to 3—journal bearings 50 are used for shafts 51. The rotation of the shaft 51 in the journal bearing 50 (or vice versa) sometimes gives rise to acoustic events F, i.e. events caused by changes between different friction modes (e.g. change from kinetic friction to static friction and vice versa). This involves slip-stick events in which surfaces are alternating between sticking to each other and sliding over each other, with a corresponding change in the force of friction. Typically, the static friction coefficient between two surfaces is larger than the kinetic friction coefficient. If an applied force is large enough to overcome the static friction, then the reduction of the friction to the kinetic friction can cause a sudden jump in the velocity of the movement. This slip-stick event give rise to an acoustic event F. Another source of an acoustic event are e.g. damages or wear marks in the journal bearing 50 which under rotation generate an acoustic event F.

Figure 4:
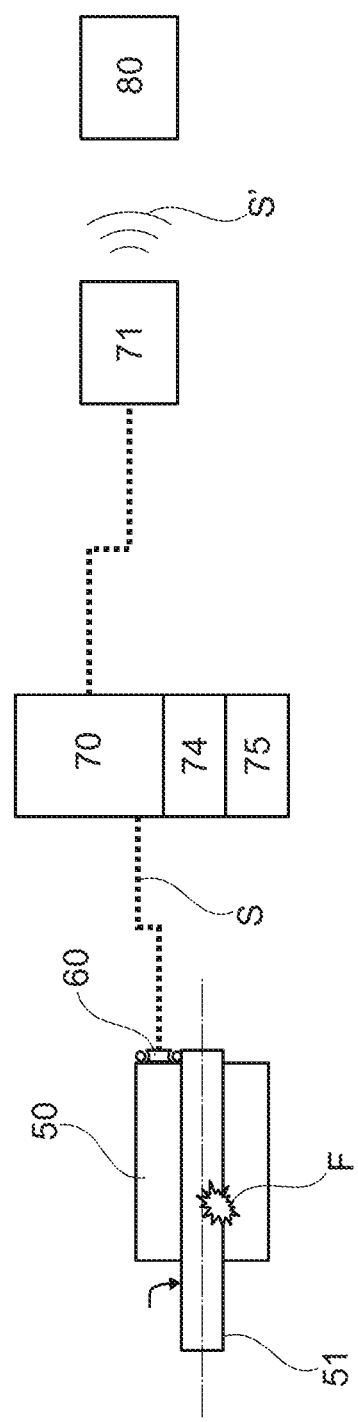
FIG. 4 shows schematically an embodiment of a method and a device for monitoring a journal bearing in respect to acoustic events.

In FIG. 4 an embodiment of a method and a device for monitoring a journal bearing 50 in respect to at least one acoustic event F is schematically shown.

A shaft 51 is rotating in a journal bearing 50 in a generally known way. The journal bearing 50 can e.g. be a bearing for a planet gear 32 as will be described in FIG. 5.

During the operation acoustic events F are e.g. generated due to slip-stick event and/or damage events. This results in a time dependent acoustic signal, i.e. a solid borne sound signal S which is sensed by a solid borne sound signal sensor 60. In the embodiment shown, this solid borne sound signal sensor 60 is a piezoelectric sensor acoustic emission sensor which is connected to the non-rotating journal bearing 50 through a glue connection.

The solid borne sound signal S, i.e. the output signal of the solid borne sound signal sensor 60 is transmitted to a signal pre-processing device 70. In the embodiment shown, the signal S is transmitted over a wire connection.

The signal pre-processing device 70 in this embodiment comprises an amplifier device 74 and a filter device 75 for the processing of the signal S. This signal pre-processing is used to allow efficient wireless signal transmission to a signal evaluation device 80 which performs the actual analysis of the solid borne sound signal S to e.g. determine damages in the journal bearing 50.

The solid borne sound signal S comprises many components at different frequencies. Sound components due to slip-stick events are predominantly in the frequency range above 200 kHz. Hence, the amplifier device 74 is set to amplify the frequencies above 200 kHz. The most important acoustic harmonics in connection with journal bearings 50 have frequency of less than 1 MHz so that the amplifier device 74 can be designed to amplify specifically the frequency range between 200 kHz and 1 MHz.

In addition to the amplification of the relevant high frequencies or a specific frequency range, the acoustic frequencies caused by the epicyclic gearbox 30 (e.g. by meshing teeth) are lower. It has been found that by filtering frequencies below 50 kHz, the overall quality of the signal and the signal transmission can be improved. The pre-processing device 70 comprises a filter device 75 (i.e. a highpass filter) which filters (attenuates) the frequencies below 50 kHz. A bandpass filter device could also be used to filter out the frequency components in the range of 5 Hz to 50 kHz.

In the embodiment shown here, an amplifier device 74 and filter device 75 used in conjunction. Alternatively, only one of the device 74, 75 can be used.

In a further embodiment, the output signal of the pre-processing device 70 is handled as a homodyne signal. This means information is encoded in the signal S' as a modulation of the phase and/or frequency of an oscillating signal, by comparing that signal with a standard oscillation that would be identical to the signal if it carried null information.

This makes the signal S' less sensitive to frequency fluctuations.

The processed signal S', i.e. the output signal of the pre-processing device 70 is transmitted to an antenna device 71 which then transmits the signal S' to the signal evaluation device 80. The signal evaluation device 80 can be located elsewhere, e.g. it can be integrated with a central data processing device. In the signal evaluation device 80 the signal S' is processed to identify e.g. slip-stick events F or acoustic signals due to mechanical damages in the journal bearing 50.

Figure 5:
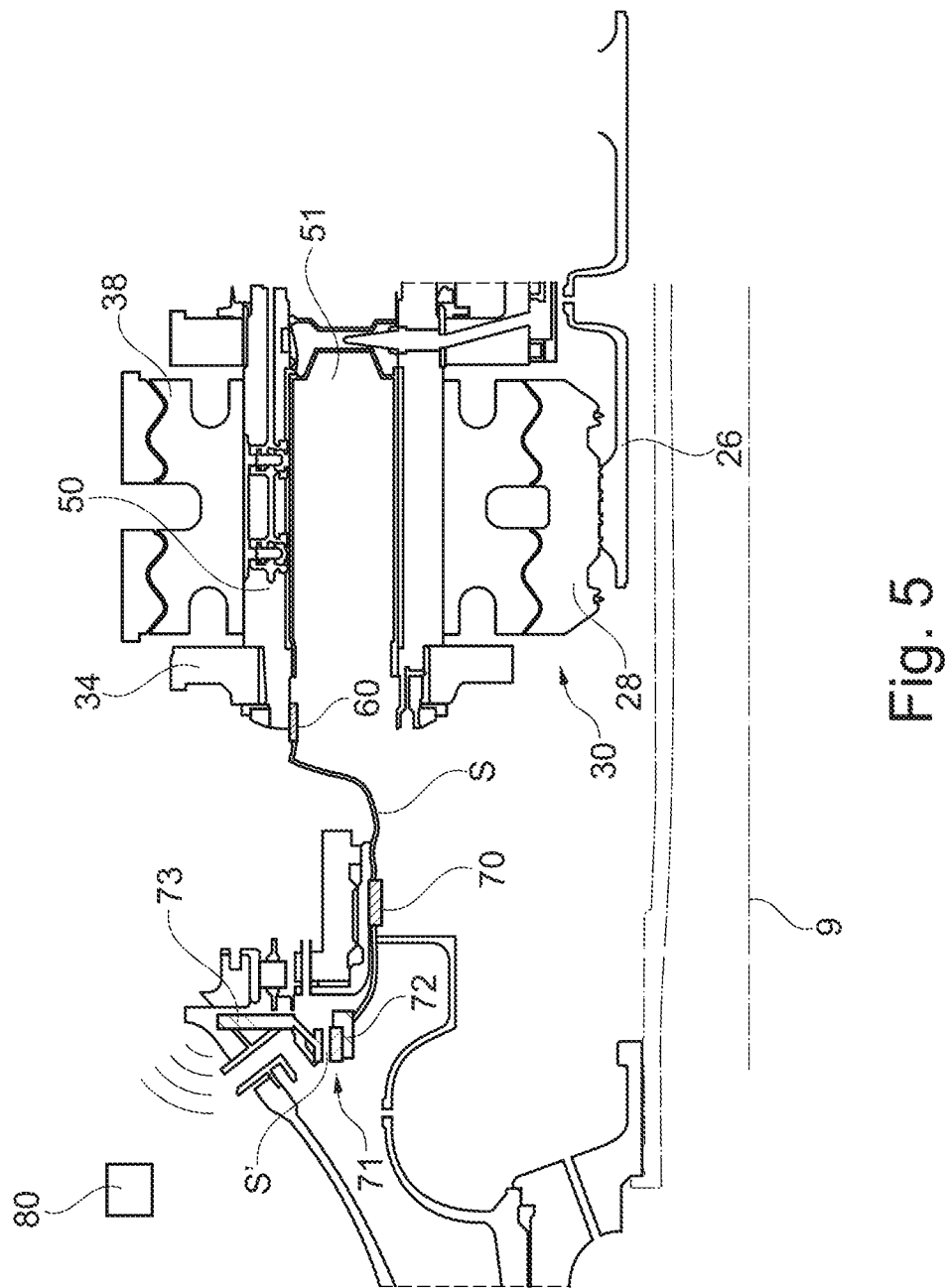
FIG. 5 shows an embodiment of a method and a device for monitoring a journal bearing for a planetary gear in an epicyclic gearbox of a geared turbofan engine.

The embodiment shown in FIG. 4 can e.g. be used in connection with a geared turbofan engine 10 as described in FIGS. 1 to 3. This is shown in FIG. 5. The relevant description of FIG. 4 is applicable.

In the embodiment of FIG. 5 the solid borne sound signal sensor 60 is attached to a journal bearing 50 of shaft 51 of a planetary gear 32. For the sake of simplicity only one of the solid borne sound signal sensors 60 is shown. It is possible to monitor all, e.g. five planetary gears 32 in the gearbox 30. In addition other journal bearings 50 within the engine 10 can be monitored.

The solid borne sound signal sensor 60 is glued to a rotating part of the gearbox 30, a wire connection leading towards the pre-processing device 70 which is mounted in the vicinity of the gearbox 30, here axially in front of the gearbox 30 but within a cavity of the gearbox.

The processing (amplification, filtering) is performed as described in connection with the embodiment shown in FIG. 4.

The processed signal S' is transmitted to the antenna device 71. The antenna device 71 comprises a rotating antenna element 72 and a static antenna element 73.

The rotating antenna element 72 with a support base is a ring-like device (width approximately 30 mm) mounted to a rotating part of the output shaft device of the gearbox 30. Radially outward is the static antenna element 73 which is also a ring-like device (width approximately 30 mm). Between the two elements 72, 73 there is a gap of approximately 10 mm. The output signal of the signal pre-processing device 70 is transmitted wirelessly from the static antenna element 72 (i.e. the sender) over that gap to the static antenna element 73 (i.e. the receiver). The static antenna element 73 wirelessly transmits the signal to the signal evaluation device 80.

Here the above-mentioned modulation scheme can be used since a form of superposition is used as the rotating antenna 72 adds or subtracts from the received signal the received from the static antenna 73. Because the two antennas 72, 73 are tuned to each other and are inductively coupled, a disturbance on the rotating antenna 72 is mirrored at a smaller amplitude on the static antenna 73. It can be recovered by comparing the signal recovered from the static antenna 73 with the baseband signal that is being sent to it.

It should be noted that the gap between the antenna elements 72, 73 allows oil flow. The axial dimension of the antenna elements 72, 73 is chosen to allow for some axial movement. A typical rotational speed for the radially inner rotating antenna element 72 is between 1500 and 2000 rpm. The antenna design is robust to withstand temperatures up to 160° C.

It will be understood that the solution is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

In FIG. 6 the processing of the output of the sound solid borne sound sensor 60 is shown schematically.

In step 101 the signal comprises the friction signal and the machine noised in one, signal symbolized by the rectangular signal. This means, no temporal variable signal, let alone periodic signal is present.

By filtering and filtering (step 102) a signal is obtained in step 103 which shows the periodic friction signal from the journal bearing 50 due to e.g. a defect.

Step 102 comprises that frequency components of the solid borne sound signal with of more than 250 kHz are amplified in the signal pre-processing device 70 and frequency components of the solid borne sound signal S with a frequency of less than 50 kHz, are attenuated in the signal pre-processing device 70.

LIST OF REFERENCE NUMBERS 9 principal rotational axis
10 gas turbine engine (geared turbo fan engine)
11 engine core
12 air intake
14 low-pressure compressor
15 high-pressure compressor
16 combustion equipment
17 high-pressure turbine
18 bypass exhaust nozzle
19 low-pressure turbine
20 core exhaust nozzle
21 nacelle
22 bypass duct
23 propulsive fan
24 stationary support structure
26 shaft
27 interconnecting shaft
28 sun gear
30 gearbox
32 planet gears
34 planet carrier
36 linkages
38 ring gear
40 linkages
50 journal bearing 51 shaft in journal bearing
60 solid borne sound sensor
70 signal pre-processing device
71 antenna device
72 rotating antenna element
73 static antenna element
74 amplifier device
75 filter device
80 signal evaluation device
101 signal
102 signal processing
103 processed signal
A core airflow
B bypass airflow
F acoustic event
S solid borne sound signal
S' pre-processed solid borne sound signal

The invention claimed is:

1. A method for monitoring at least one journal bearing for a shaft in respect to at least one acoustic event in the at least one journal bearing, comprising:
providing a gas turbine engine for an aircraft comprising:
an engine core comprising a turbine, a compressor, and a core shaft connecting the turbine to the compressor;
a fan located upstream of the engine core, the fan comprising a plurality of fan blades;
a gearbox that receives an input from the core shaft and outputs drive to the fan so as to drive the fan at a lower rotational speed than the core shaft,
the gearbox including the at least one journal bearing and a further shaft, the at least one journal bearing rotationally supported on the further shaft;
a) detecting a time dependent solid borne sound signal, emitted by the at least one journal bearing, with at least one solid borne sound signal sensor, the time dependent solid borne sound signal being representative of the at least one acoustic event, the at least one acoustic event created by relative rotation between the further shaft and the at least one journal bearing;
b) transmitting the output signal of the at least one solid borne sound signal sensor to a signal pre-processing device,
c) amplifying frequency components of the solid borne sound signal having only a frequency between 200 kHz and 1 MHz in the signal pre-processing device; and subsequently
d) wirelessly transmitting the output signal of the signal pre-processing device via an antenna device to a signal evaluation device for detecting and/or locating of the at least one acoustic event, and demodulating the output signal of the signal pre-processing device with the signal evaluation device to detect the at least one acoustic event, localize the at least one acoustic event and/or detect a wear status of the at least one journal bearing.

2. The method of claim 1, and further comprising transmitting the output of the at least one solid borne sound signal sensor over a wire and/or wirelessly to the signal pre-processing device.

3. The method of claim 1, and further comprising encoding the output signal of the signal pre-processing device as a homodyne signal.

4. The method of claim 1, and further comprising providing that the at least one journal bearing is part of an epicyclic gearbox of a geared turbofan engine.

5. The method of claim 4, and further comprising monitoring all planet gears of the epicyclic gearbox with respect to the at least one acoustic event.

6. The method of claim 4, and further comprising providing that the antenna device is at least in part coupled to a rotating part connected to the gearbox.

7. The method of claim 6, and further providing that the antenna device includes a rotating antenna element connected to a rotating part of the gearbox and operatively connected to a static antenna element connected to a static part of the geared turbofan engine.

8. The method of claim 1, wherein the at least one acoustic event is generated by 1) Changes between different friction modes between the at least one journal bearing and the further shaft and/or 2) damages or wear marks in one or both of the at least one journal bearing and the further shaft.

9. A system for monitoring at least one journal bearing for a shaft in respect to at least one acoustic event in the at least one journal bearing, comprising:
a gas turbine engine for an aircraft comprising:
an engine core comprising a turbine, a compressor, and a core shaft connecting the turbine to the compressor;
a fan located upstream of the engine core, the fan comprising a plurality of fan blades;
a gearbox that receives an input from the core shaft and outputs drive to the fan so as to drive the fan at a lower rotational speed than the core shaft,
the gearbox including the at least one journal bearing and a further shaft, the at least one journal bearing rotationally supported on the further shaft;
at least one solid borne sound signal sensor configured for detecting a time dependent solid borne sound signal emitted by the at least one journal bearing, the time dependent solid borne sound signal being representative of the at least one acoustic event, the at least one acoustic event created by relative rotation between the further shaft and the at least one journal bearing;
a signal pre-processing device configured for pre-processing the at least one solid borne sound signal received from the at least one solid borne signal sensor,
an amplifier device configured for amplifying frequency components of the solid borne sound signal having only a frequency between 200 kHz and 1 MHz,
a wireless transmitter comprising an antenna device configured for outputting a signal of the signal pre-processing device, and
a signal evaluation device configured for wirelessly receiving the output signal of the signal pre-processing device, the signal evaluation device comprising a detection device and/or a location device for the at least one acoustic event, wherein the signal evaluation device is configured to demodulate the output signal of the signal pre-processing device for detecting the at least one acoustic event, localizing the at least one acoustic event and/or detecting a wear status of the at least one journal bearing.

10. The system according to claim 9, wherein the at least one solid borne sound signal sensor is a piezoelectric element, coupled to the at least one journal bearing with a glue connection.

11. The system according to claim 9, wherein the antenna device includes a rotating antenna element, connected to a rotating part of the gearbox and configured as a wireless sender and a static antenna element connected to a static part, a static part of the gearbox and configured as a wireless receiver.

12. The system according to claim 9, wherein
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

\* \* \* \* \*